Feb. 24, 1959 H. KAPLAN 2,875,412

PULSE WIDTH MODULATOR

Filed Nov. 20, 1956 3 Sheets-Sheet 1

INVENTOR.
HENRY KAPLAN
BY
J. Walter Schilpp
ATTORNEY

Feb. 24, 1959 H. KAPLAN 2,875,412

PULSE WIDTH MODULATOR

Filed Nov. 20, 1956

3 Sheets-Sheet 2

*INVENTOR.*
HENRY KAPLAN

*BY* [signature]

ATTORNEY

Feb. 24, 1959 H. KAPLAN 2,875,412

PULSE WIDTH MODULATOR

Filed Nov. 20, 1956 3 Sheets-Sheet 3

INVENTOR.
HENRY KAPLAN

BY

ATTORNEY

United States Patent Office 2,875,412

Patented Feb. 24, 1959

2,875,412

PULSE WIDTH MODULATOR

Henry Kaplan, Broomall, Pa., assignor to Burroughs Corporation, Detroit, Mich., a corporation of Michigan Application November 20, 1956, Serial No. 623,377

11 Claims. (Cl. 332—12)

This invention relates to a pulse-width modulation system. More particularly, the present invention provides a pulse-width modulator employing solid-state components.

While not limited thereto, the pulse-width modulator provided by the present invention may be employed advantageously in a telemetering system where it may be used at the transmitter to modulate the radio-frequency carrier. For example, in a typical telemetering system, a varying unidirectional voltage is developed by a potentiometer whose movable arm is actuated by a mechanical or other force in response to changes in, for example, speed, wind velocity, pressure, temperature, etc. The varying unidirectional voltage may be converted by the pulse-width modulator of the present invention to fixed amplitude pulses of varying width and these may be employed to modulate the phase, frequency or amplitude of an R.-F. carrier. Thus, information with respect to such variable factors as those mentioned above, and many others, may be transmitted to a remote control point.

It is an object, then, of the present invention to provide a pulse-width modulator employing solid-state components.

A more specific object is to provide, for a telemetering system, a circuit using transistors and magnetic cores for developing pulses of fixed amplitude whose widths vary as a linear function of the value of a variable unidirectional voltage whose changing value it is desired to indicate at a remote point.

Another object is to provide a device for varying the width of an output pulse by controlling, in response to a modulating signal, the magnitude of the flux change in a magnetic core of high retentivity.

These and other objects are, in a preferred embodiment of the invention, achieved by a device comprising a pair of similar circuits which are 180° out of phase with respect to each other. Each circuit includes two junction transistors whose collector currents pass through windings of a magnetic core exhibiting very high flux retentivity. A square-wave generator of fixed frequency and having a common ground connection is employed to apply out-of-phase square-wave voltages to the first transistor of each circuit. Where, for example, the transistors employed are PNP type, the negative pulse occurring during the negative half cycle of the square-wave is effective to "bottom" the transistor to which is applied, i. e., is effective to drive the transistor into saturation. The high retentivity magnetic core of each circuit is initially magnetized to have a flux remanence of such polarity that when the first transistor bottoms the core flux is driven from its state of remanence toward flux saturation of opposite polarity. The magnitude of the departure from remanence is dependent upon the fixed time period during which the transistor is bottomed and the magnitude of the variable unidirectional voltage which functions as the modulating signal. The circuit parameters are so selected that the maximum expected value of the modulating signal is either just sufficient or insufficient to fully switch the core. At the termination of the applied negative pulse, the first transistor cuts off, and in response thereto the second transistor is triggered into conduction. The second transistor is connected in regenerative manner so that the second transistor quickly bottoms. When this occurs, there is developed across the windings of the magnetic core a voltage pulse of fixed amplitude whose duration is dependent upon the magnitude of the change in flux as the core returns to its original state of remanence. The magnitude of this flux change is equal to the change in flux which occurred previously when the core was driven from its state of remanence toward the opposite state, which, as previously indicated, was dependent upon the magnitude of the modulating signal. Thus, the device is capable of delivering output pulses of fixed amplitude whose width varies as a function of a variable unidirectional voltage whose value it is desired to furnish to, for example, a remote control point.

While the foregoing is a summary of a preferred embodiment, the invention will be best understood from a consideration of the following detailed description taken together with the drawing in which.

Figure 1:
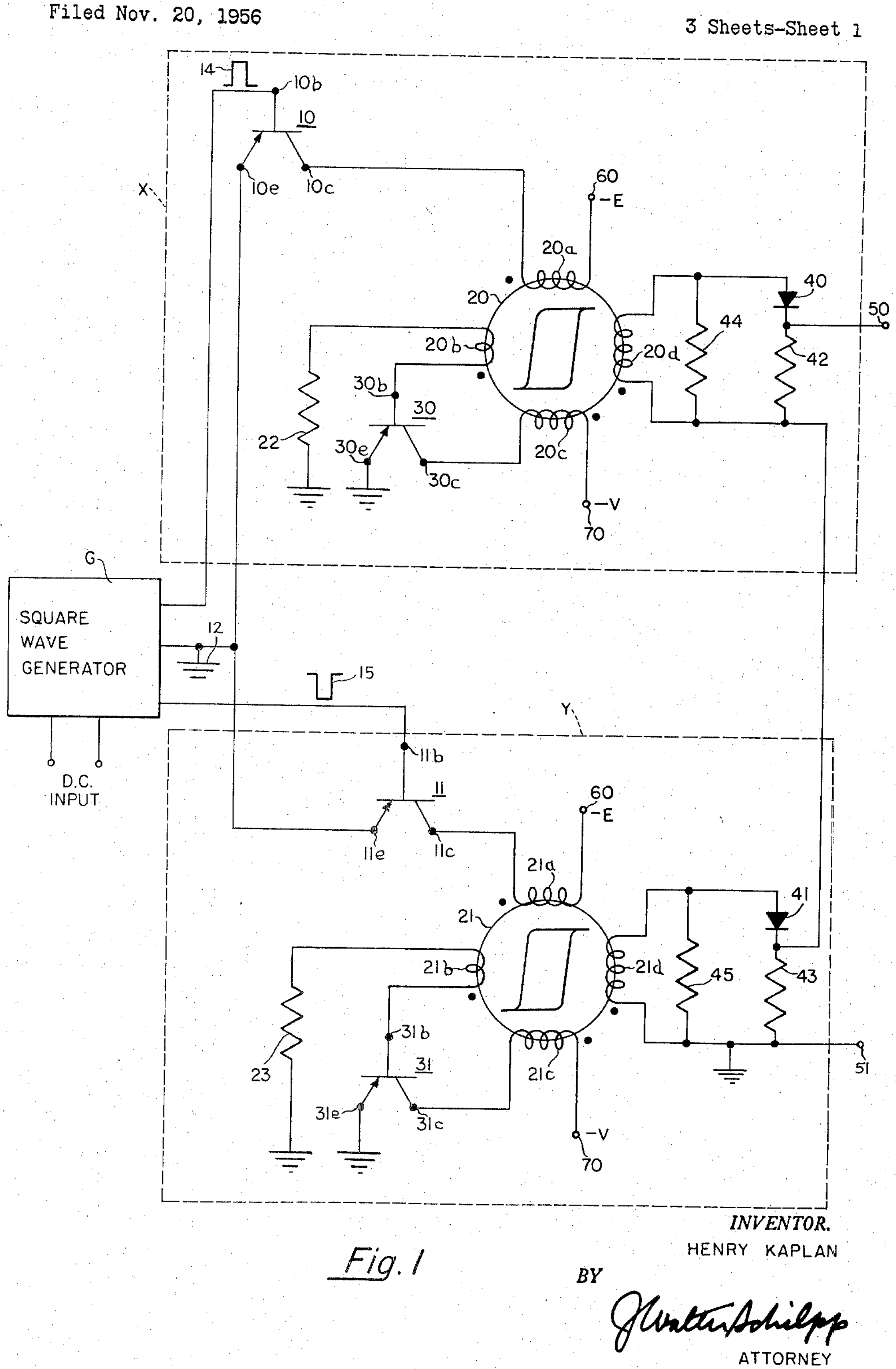
Fig. 1 is a schematic illustration of a preferred embodiment of a pulse modulator circuit embodying the invention.

Referring now to Fig. 1, the device of the present invention, in a preferred form, is shown to comprise a pair of similar circuits shown in the dotted rectangles and identified as X and Y. Each of these circuits includes a pair of transistors 10, 30 and 11, 31, preferably junction type, and a magnetic core 20 and 21 exhibiting high flux retentivity and having four windings. A square-wave generator G having a common grounded connection 12 is connected to apply out-of-phase square voltage waves to the bases **10*b* and 11*b* of transistors 10 and 11 of circuits X and Y, respectively. Accordingly, at the time a pulse of one polarity is being applied to the base 10*b* of transistor 10, a pulse of opposite polarity is being applied to the base 11*b* of transistor 11. Where both transistors 10, 11, are of the same conduction type, as is the case in the circuit of Fig. 1 where all four transistors are shown to be of the PNP type, one of the transistors 10, 11**, will be reversed biased by the applied square-wave during the same time that the other transistor is being forward biased.

Assume an instant when a positive pulse is applied to the base of transistor 10 and a negative pulse is applied to the base of transistor 11. This is indicated in Fig. 1 by the pulses 14 and 15. Transistor 10 will be reversed biased by the positive pulse 14 and transistor 11 will be forward biased by the negative pulse 15. The negative pulse 15 is of sufficient magnitude to "bottom" transistor 11, that is, to drive transistor 11 into saturation. Throughout this specification it will be convenient to use the term "bottom" to refer to the state of a transistor when it is conducting at saturation. This will avoid any confusion which might arise from the use of the term "saturation," since the latter term will be used to refer to a state of the magnetic core.

When, as a result of negative pulse 15, transistor 11 bottoms, the internal resistance between the emitter and collector is extremely small and the potential at the collector **11*c* is substantially equal to that at the emitter 11*e*, the difference therebetween being perhaps .01 volt. This difference is small enough to be ignored, and throughout the remainder of this specification it will be assumed that when a transistor is bottomed the collector potential is the same as the emitter potential. Since the emitter 11$e$ is at ground potential, the potential of the collector 11$c$, when transistor 11 is bottomed, is also at ground potential. This is shown graphically in Fig. 2($b$) where the potential of collector 11**$c$ is shown as being at ground during the negative half-cycle portion of the applied square-wave shown in Fig. 2($a$).

Referring again to Fig. 1, the collector 11$c$ of transistor 11 is connected by way of winding 21$a$ to a source 60 of variable negative voltage —E. This is the variable unidirectional voltage whose value it is desired to indicate at, for example, a remote point, and this is the voltage which is used, in the embodiment of the present invention now being described, to modulate the width of fixed amplitude output pulses, as will be described.

If the potential at the collector 11$c$ is at ground, as it is when the transistor is bottomed, while the potential at the negative voltage source 60 is at a value —E, it follows necessarily that a voltage equal in magnitude to E must appear across the winding 21$a$. As shown in Fig. 1, the winding 21$a$ is one of four windings on a magnetic core 21 which may be a tape-wound toroid. Core 21 is made of material, such as moly-permalloy, having high flux retentivity and a substantially rectangular hysteresis loop. The other three windings on core 21 are identified in Fig. 1 by the reference numerals 21$b$, 21$c$ and 21$d$. For the purpose of the present description, and as indicated in Fig. 1, it will be assumed that winding 21$b$ has fewer turns than the other three and that each of the said other three consists of the same number of turns, although this is not essential. Accordingly, when transistor 11 bottoms and a voltage of value E appears across the winding 21$a$, a voltage equal in magnitude to E, though not necessarily of the same polarity, is induced in each of the windings 21$c$ and 21$d$ due to the mutual coupling therebetween. A voltage, but of smaller value, is, of course, also induced in winding 21$b$ which is connected in the base-emitter circuit of the second transistor 31 of the circuit Y. Like first transistor 11, the second transistor 31 is also a PNP junction transistor. During the time that first transistor 11 is bottomed, the current in the collector circuit of the said first transistor is shown as flowing into the dotted end of the winding 21$a$. Hence, the voltage induced across the winding 21$b$ in the base circuit of second transistor 31 will be of a polarity tending to drive current into the non-dotted end of the winding 21$b$ and into the base 31$b$ of second transistor 31. Since this is in the high resistance direction, it will be seen that during the time the first transistor 11 is bottomed, the second transistor 31 is reversed biased and cut off.

As shown in Fig. 1, a source of fixed negative voltage 70 is connected to the collector 31$c$ of the second transistor 31 by way of the third winding 21$c$ on the magnetic core 21. Throughout this specification, the value of the fixed voltage 70 will be referred to as —V.

As indicated hereinbefore, when the first transistor 11 bottoms, a voltage E equal in magnitude to that of the variable source 60 appears across each of the three windings 21$a$, 21$c$, and 21$d$ of the core 21. Thus when transistor 31 is cut off, the potential at the collector 31$c$ is $-E+(-V)$. This is shown graphically in Fig. 2($c$).

It will be noted that the action taking place in the lower circuit Y is being described. It will be convenient to continue to describe the action in one circuit, in this instance, the lower circuit. It may be said here, however, that the two circuits X and Y are similar, and except for the fact that the circuits are 180° out of phase with each other, the action in each of the two circuits is the same.

Figure 3:
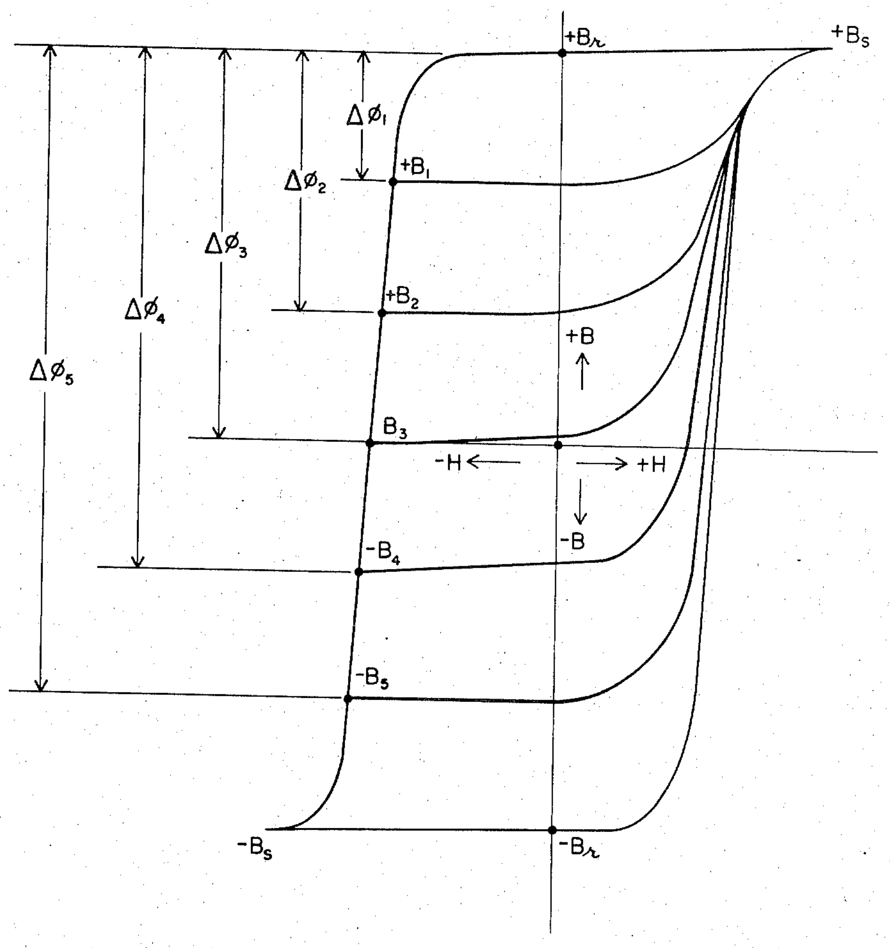
Fig. 3 is an idealized hysteresis loop of the magnetic material used as a core in the device of the present invention.

Reference is now made to Fig. 3 wherein is shown an idealized hysteresis loop of the magnetic material which is used as the cores 20 and 21 of the circuits X and Y. Confining the present discussion to the action occurring in the lower circuit Y, assume that just prior to the application of the negative pulse which is effective to bottom the transistor 11, the magnetic core 21 is in the positive state of residual magnetism or remanence, indicated on the loop as point $+B_r$. When the transistor 11 bottoms, the current rise through the winding 21$a$ induces a voltage therein whose magnitude is a function of the time rate change of flux which, in the circuit of Fig. 1 is, in turn, a function of the value of the negative voltage —E of source 60. The polarity of the induced voltage and of the associated magnetizing force H is such as to drive the flux in the core 21 from its positive state of remanence at point $+B_r$ toward the negative saturation point $-B_s$. In accordance with the embodiment of the invention presently being described, the circuit is so designed and the circuit parameters are so selected that only the largest expected value of negative voltage —E at source 60 will be sufficient to switch the core to negative saturation within the fixed time T of the negative half-cycle of the applied square-wave, all values of —E smaller than the expected maximum being insufficient to fully switch the core. Alternatively, the circuit parameters may be so chosen that none of the expected values of —E will be large enough to fully switch the core.

The above may be clarified by a simple illustration. Assume that the variable negative voltage —E at source 60 is expected to vary between 0 and —5 volts. The number of turns of the winding 21$a$ and the other circuit parameters are so chosen, having in mind the hysteresis loop of the particular magnetic core involved, that if, at the time the transistor 11 bottoms, the variable voltage —E has the expected maximum value of —5 volts, the core 21 will be driven, within the fixed time T of the applied negative pulse, from the positive remanence point $+B_r$ down the left or negative flank of the loop either just to the negative saturation point $-B_s$ or, alternatively, to a point such as $-B_5$ at which the core is less than fully switched. The design requirement to be met is that values of —E smaller than expected maximum do not drive the flux level all the way down to saturation. It will be understood that if, at the time transistor 11 bottoms, the variable voltage —E has a value, for example, of only —1 volt, the core will be driven within the fixed time T from the positive remanence point $+B_r$ down the left flank portion of the loop only as far as the point $+B_1$. Similarly, if when transistor 11 bottoms, the value of the source 60 is —2 volts, or —3 volts, or —4 volts, the state of magnetism of core 21 will change from the positive remanence $+B_r$ to that represented in Fig. 3 by the point on the left flank of the loop whose sub-script corresponds to the value of the voltage —E. The change in flux $\Delta\phi_a$ occurring during the period T is represented by the expression:

$$\Delta\phi_a = \frac{E_1 T}{N_1}$$

Where $E_1$=the self-induced voltage in winding 21$a$ and equal to the negative voltage of source 60

$T$=the duration of the negative pulse from generator G $N_1$=the number of turns on winding 21$a$ Referring again to Fig. 1, when the negative pulse 15 terminates, the transistor 11 is cut off and the large collector current which had been flowing in the winding 21$a$ decreases sharply to zero. When this occurs, the magnetic field of the winding 21$a$ collapses and a sharp pulse of voltage is self-induced in the winding. Due to the mutual coupling between the several windings of the core 21, a voltage pulse also appears across the winding 21$b$ in the base circuit of the transistor 31 and is of such polarity as to drive current into the dotted end of the winding 21$b$. Since this is the low resistance direction, it will be seen that the tansistor 31 is now biased in the forward direction. The collector current through the transistor 31 therefore increases from the leakage value theretofore existing, and the increase in current is effective to self-induce a voltage in the winding 21*c* in the collector circuit. Due to the mutual coupling between the winding 21*c* and 21*b* a feedback voltage is induced in the winding 21*b* in the base circuit and is of such polarity as to further increase the forward bias on transistor 31. This further increases the collector current. The action is regenerative and transistor 31 bottoms.

When transistor 31 bottoms, the emitter-to-collector internal resistance is extremely small and the collector potential is substantially equal to that at the emitter 31*e*, which is at ground potential. And, since the collector 31*c* is connected by way of the winding 21*c* to a source 70 of fixed voltage of value —V, a voltage equal in value to V must appear across the winding 21*c*. Due to the mutual coupling between all of the windings of the core 21, and the fact that windings 21*a*, 21*c* and 21*d* have the same number of turns, a voltage of magnitude V is induced in each of the windings 21*a* and 21*d*. The voltage V induced in winding 21*a* in the collector circuit of the first transistor is of such polarity as to tend to drive current into the non-dotted end of the winding 21*a*. Thus, the induced voltage in winding 21*a* is additive to that of the source 60 and the potential at the collector 11*c* of transistor 11, which is now non-conducting, is $-E+(-V)$. This is shown graphically in Fig. 2(*b*).

It is to be noted that when the first transistor 11 was bottomed its collector current was into the dotted end of winding 21*a*, whereas when the second transistor 31 is bottomed, its collector current is into the non-dotted end of the winding 21*c*. Thus, the magnetizing force applied to the core 21 when the second transistor 31 bottoms is opposite to that which was applied when the first transistor 11 bottomed.

Referring again to Fig. 3, it will be seen that if, when the first transistor 11 was bottomed, the value of the negative voltage —E of source 60 was such that the core flux was driven from its positive remanent point $+B_r$ to a flux level represented, for example, by the point $-B_5$, then, when the second transistor 31 bottoms, the core flux will be driven back from the flux level represented by the point $-B_5$. Or, if when transistor 11 bottomed, the value of the voltage source 60 was such that the core flux was driven only to the level represented by the point $+B_2$, then the core flux will be driven back from the point $+B_2$. In each instance, however, the flux is returned all the way to the state of remanence $+B_r$ from whatever flux level it had reached during the time the first transistor 11 was bottomed. That the flux returns all the way to the remanence state $+B_r$ is indicated by the fact that the second transistor 31 continues to be bottomed until such flux state is reached. For, until such state of remanence is reached, there is a change of flux in the core which is effective to induce a voltage across the winding 21*b* which is of a polarity to forward bias the transistor and maintain it in bottomed condition. When, however, the core flux reaches the positive saturation level, which in the hysteresis curve of Fig. 3 is indicated by the point $+B_s$ located just slightly above the positive remanence state $+B_r$, there is no longer any change of flux and hence no longer a regenerative feedback, and transistor 31 cuts off. With all magnetizing force now removed, the flux level slides back to the positive state of remanence $+B_r$.

It follows from the above that the flux change which occurs in the core 21 when the transistor 31 bottoms is equal in magnitude, though opposite in polarity, to that which occurred priorly when the transistor 11 bottomed.

As previously indicated, when the transistor 31 bottoms, the voltage developed across the winding 21*c* is equal in magnitude to that of the fixed voltage —V at source 70. The fourth winding 21*d* functions as the output winding, and when the transistor 31 bottoms, a voltage pulse of amplitude V also appears across this winding.

While the amplitude of this output pulse is fixed by the value of the fixed voltage source 70, the duration or width of this pulse is dependent upon the time period for which the second transistor 31 is bottomed, and this time period is, in turn, dependent upon the level on the hysteresis loop of Fig. 3 to which the core flux was driven during the fixed time T that the first transistor 11 was bottomed, which flux level, as previously indicated, is, in turn, dependent upon the value of the negative voltage —E at source 60 at the time the transistor 11 bottomed. Thus, the duration or width $T_0$ of the voltage pulse developed when the second transistor 31 bottoms is dependent upon the value of the voltage —E at the time the first transistor 11 bottomed.

This may also be shown by the following: It will be recalled that the flux change $\Delta\phi_a$ which occurred in the fixed time T during which the core was driven away from its remanence state may be represented by the expression previously given namely, $$\Delta\phi_a=\frac{E_1T}{N_1}$$

The flux change $\Delta\phi_r$ which occurs when the core returns (from the flux level to which it had been driven) to the remanence state is represented by the expression $$\Delta\phi_r=\frac{VT_0}{N_3}$$

Where $V$=the voltage across the winding $21_c$ equal to source 70
$T_0$=the time duration of the voltage V
$N_3$=the number of turns on winding $21_c$ Since $$\Delta\phi_a=\Delta\phi_r$$

Then $$\frac{E_1T}{N_1}=\frac{VT_0}{N_3}$$

And, if $$N_1=N_3$$

Then $$E_1T=VT_0$$

And if T is fixed, and V is fixed, then $T_0$ is linearly proportional to $E_1$

Figure 2:
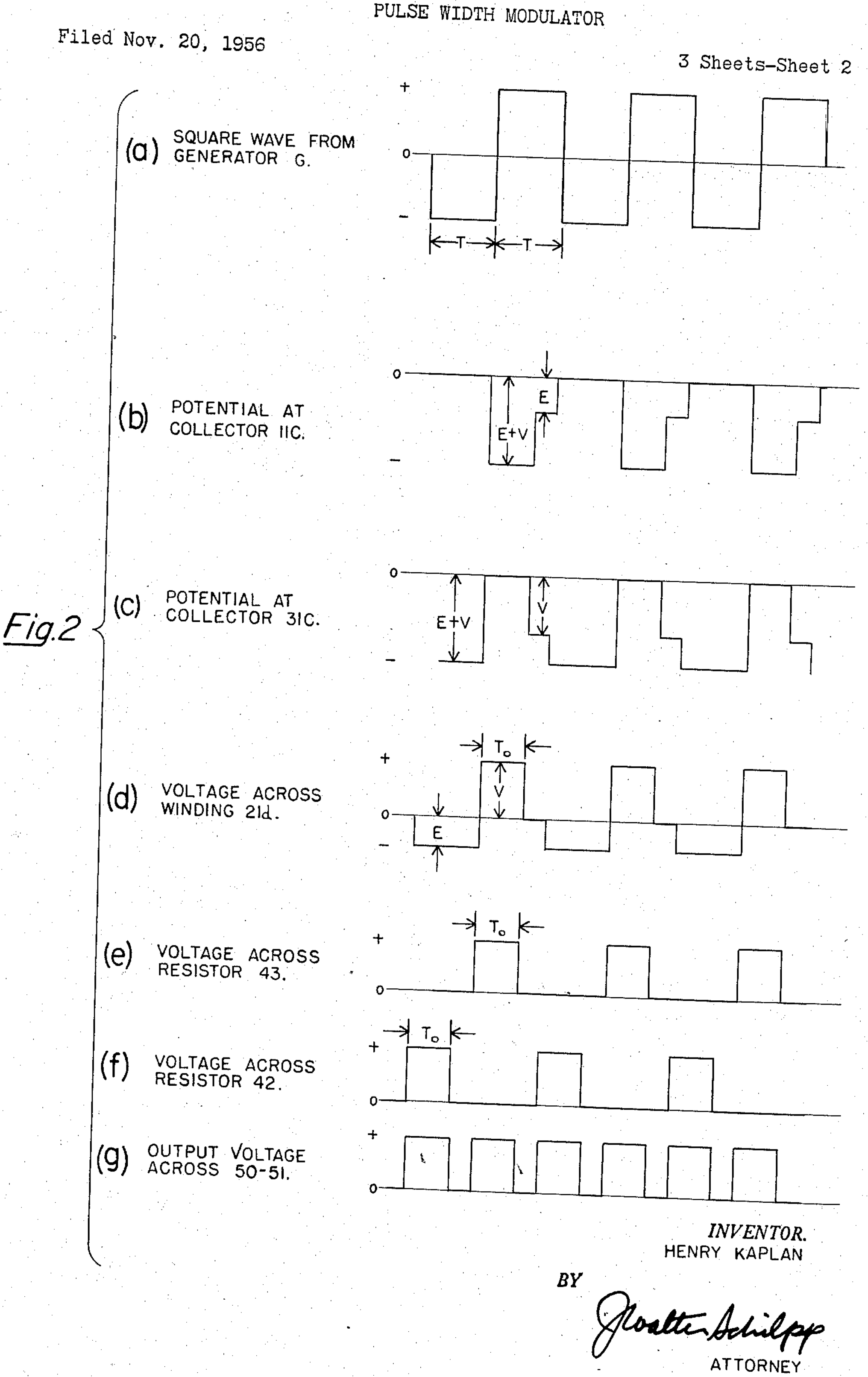
Fig. 2 is a graph showing the waveforms at various points in the circuit of Fig. 1.

In Fig. 2(*d*) the waveform of the output voltage cross the output coil 21*d* is graphically shown. It will be remembered that during the period T that the transistor 11 is bottomed, the voltage across the three windings 21*a*, 21*c* and 21*d* of the core 21 is equal in magnitude to that of the voltage —E. During this period, the voltage induced in the output winding 21*d* is of such polarity as to tend to drive current into the non-dotted end of the winding 21*d*. The duration of this voltage across winding 21*d* is equal to the duration T of the negative pulse 15 applied from the square-wave generator G across the base emitter circuit of the transistor 11. This is due to the fact that, as indicated hereinbefore, the circuit parameters are so chosen relative to the frequency of the applied square-wave that the core flux does not fully shift in the time T even in the presence of the maximum expected value of the variable negative voltage —E at source 60. When the applied negative pulse terminates and the transistor 11 cuts off, the transistor 31 bottoms and the voltage appearing across the three windings 21*a*, 21*c* and 21*d* of the core becomes equal in magnitude to the fixed voltage V. However, as shown graphically in Fig. 2(*d*) and as already indicated above, the duration or width $T_0$ of this pulse is a function of the change in flux of the magnetic core during the period that the transistor 11 was bottomed, which in turn is a function of the voltage —E at source 60.

Since we are interested only in the pulses of varying width, the voltage pulses of magnitude E occurring during the period T that the transistor 11 is bottomed, and which tend to drive current into the non-dotted end of winding 21*d*, are prevented by the diode 41 from appearing across output load resistor 43. Thus, the voltage output appearing across the resistor 43 is as shown in Fig. 2(*e*).

It will be seen that the lower circuit Y of Fig. 1 is effective to provide pulse-width modulated output pulses on alternate half cycles of the square-wave generator G. To obtain useful output pulses on the other alternate half cycles, a similar circuit, the upper circuit X in Fig. 1, is provided comprising the transistors 10 and 30 and the high retentivity magnetic core 20 having the four windings 20*a*, 20*b*, 20*c* and 20*d*. Since the upper circuit X operates in the same manner as the lower circuit Y just described, it is not necessary to describe the action in detail. Attention is again called to the fact that when the first transistor 10 of the upper circuit is bottomed, the first transistor 11 of the lower circuit is cut off, and vice-versa. Thus, the output across the resistor 42 is shown in Fig. 2(*f*) and the total output across the terminals 50, 51 is as shown in Fig. 2(g).

Given below are the values of a pulse-width modulator circuit similar to that shown in Fig. 1 which was actually built and tested. These values are, of course, merely illustrative and not limiting.

| | |
|---|---|
| Transistors **10**, **11**, **30**, **31** (PNP junction) | 2N135. |
| Diodes **40**, **41** | T6. |
| Windings **20***a*, **20***c*, **20***d*, **21***a*, **21***c*, **21***d* | 200 turns. |
| Windings **20***b*, **21***b* | 100 turns. |
| Resistors **22**, **23** | 1K. |
| Resistors **44**, **45** | 3K. |
| Resistors **42**, **43** | 10K. |
| Voltage Source **70** (—V) | —5V. |
| Voltage Source **60** (—E) | 0 to —5V (variable). |

While the circuit shown and described employed PNP transistors, it will be understood that NPN transistors could, if desired, be used, in which case it would be necessary to reverse the polarities of the voltages applied.

It should also be pointed out that while the variable voltage —E at source 60 will ordinarily be so slowly varying relative to the frequency of the square-wave driving voltage that the voltage —E will be substantially fixed for the period of the negative driver pulse 15, the circuit will also operate satisfactorily where the voltage —E changes during the period of the driver pulse 15. In the latter instance, the width of the output pulse from the circuit of Fig. 1 will represent the average value of the source voltage —E during the period of the driver pulse 15.

While the square-wave generator G may be of any known suitable type, it may, if desired take the form shown and described in an article by G. H. Royer entitled "A Switching Transistor D.-C. to A.-C. Converter having an Output Frequency Proportional to the D.-C. Input Voltage," published in the AIEE Transactions, vol. 74, part 1, July 1955, pages 322–326. In that article, there is described a transistor-magnetic core square-wave generator whose output frequency is proportional to the D.-C. input voltage applied thereto. Such a square-wave generator, if used to supply the pulse-width modulator of the present invention when operating in the manner hereinbefore described, would be supplied with a D.-C. input voltage of fixed amplitude since a square-wave output of fixed frequency is wanted for driving the pulse-width modulator.

It will be recalled, however, that the modulator of the present invention, when operating in the manner hereinbefore described, produces output pulses of fixed amplitude whose width is a function of the flux change in the core, and that the flux change in the core is a function of the time period of the driving square-wave as well as of the applied collector voltage at source 60. Accordingly, it will be seen that the circuit of Fig. 1 is also capable of producing modulated output pulses in response to the application of a frequency-varying square-wave instead of a fixed-frequency square-wave to the input circuits of the transistors 10 and 11. In such case, if the source voltage at 60 be fixed, then the output pulses of the circuit of Fig. 1 will vary in width dependent upon the frequency of the square-wave driver voltage which frequency is a function of the D.-C. input voltage applied to the square-wave generator. Of course, if the frequency of the square-wave driver voltage and the magnitude of the source voltage at 60 are both varied, then the output-pulse width will be a function of both variables.

In brief, it may be pointed out that $$T_0 = \frac{-ET}{-V}$$

where $T_0$=the output pulse width
$-E$=the source voltage at 60
$-V$=the source voltage at 70
$T$=the time period of the driver pulse 15.

Thus, the output pulse width $T_0$ is a function of the other three factors —E, —T and V. In the preferred embodiment, T and —V are fixed, and $T_0$ varies linearly as —E.

What is claimed is:

1. In combination; a pair of channels each comprising first and second transistors, each transistor having emitter, base and collector; a magnetic core in each channel, each core exhibiting high flux retentivity and having first, second, third and fourth windings; a source of variable unidirectional voltage connected to the collector of the first transistor of each channel by way of the first winding of each core; a source of fixed voltage connected to the collector of the second transistor of each channel by way of the third winding of each core; means, including the second winding of each core, interconnecting the base and emitter of the second transistor of each channel; means for applying square-wave signals between the base and emitter of the first transistor of one channel and for applying square-wave signals which are 180° out of phase with said first-mentioned square-wave signals between the base and emitter of the first transistor of the other channel to drive said first transistors alternately into saturation for the duration of half-cycles of one polarity of said applied square-wave signals; regenerative means, including said first, second and third windings, for driving said second transistor of each channel into saturation in response to cut off of the first transistor of the channel; and means for deriving pulse output signals across the fourth winding of each channel, the amplitude of said output signals being a function of the fixed voltage connected to the collector of the second transistor of each channel and the pulse width of said output signals being a function of the magnitude of the variable unidirectional voltage connected to the collector of the first transistor of each channel.

2. Apparatus as claimed in claim 1 characterized in that means are provided for combining in interleaved fashion the pulse output signals derived across the fourth winding of the core of each channel.

3. In a pulse-width modulator: first and second transistors each having emitter, base and collector; a magnetic core exhibiting high flux retentivity and having at least four windings; means, including the first of said windings, connecting a source of variable unidirectional voltage to the collector of said first transistor; means for applying uniformly spaced pulses of one polarity between the base and emitter of said first transistor to bottom said first transistor for the duration of said applied pulses and to cut off said transistor during the interval between pulses;

means, including the second of said windings on said core, connected between the base and emitter of said second transistor and responsive to a flux change in said first winding for applying a trigger voltage between the base and emitter of said second transistor to trigger said second transistor into conduction; regenerative means, including the third of said windings on said core connected between the collector of said second transistor and a point of fixed voltage, effective in response to said trigger voltage to cause said second transistor to bottom; and means, including the fourth of said windings on said core, for deriving output pulses of fixed amplitude and variable width, said width being a function of the magnitude of the variable unidirectional voltage connected to the collector of said first transistor.

4. In a pulse-width modulator: first and second transistors each having emitter, base and collector; a magnetic core exhibiting high flux retentivity and having first, second, third and fourth windings; a source of variable unidirectional voltage connected to the collector of said first transistor by way of said first winding; a source of fixed voltage connected to the collector of said second transistor by way of said third winding; means, including said second winding, interconnecting the base and emitter of said second transistor; means for applying uniformly-spaced pulses of one polarity between the base and emitter of said first transistor to bottom said first transistor for the duration of the applied pulses; and means, including said second transistor, for deriving pulse output signals of fixed amplitude across said fourth winding during the periods that said first transistor is cut off, the width of said output pulse signals being a function of the magnitude of said variable unidirectional voltage connected to the collector of said first transistor.

5. In a pulse-width modulator: first and second transistors each having emitter, base and collector; a magnetic core exhibiting high flux retentivity and having first, second, third and fourth windings; a source of voltage connected to the collector of said first transistor by way of said first winding; a source of voltage connected to the collector of said second transistor by way of said third winding; means, including said second winding, interconnecting the base and emitter of said second transistor; means for applying time-spaced pulse signals of one polarity between the base and emitter of said first transistor to bottom said first transistor for the durations of the applied pulses; means, including said first and second windings, for applying a trigger voltage to said second transistor in response to said first transistor cutting off; regenerative means, including said second and third windings, for bottoming said second transistor in response to said trigger voltage; and means for deriving across said fourth winding pulse output signals whose amplitude is a function of the source voltage connected to the collector of the second transistor and whose width is a function of the duration of the pulses applied to said first transistor and of the source voltage connected to the collector of said first transistor.

6. In a pulse-width modulator; first and second transistors each having emitter, base and collector; a magnetic core exhibiting high flux retentivity and having first, second, third and fourth windings; a source of voltage connected to the collector of said first transistor by way of said first winding; a source of voltage connected to the collector of said second transistor by way of said third winding; means, including said second winding, interconnecting the base and emitter of said second transistor; means for applying time-spaced pulses of one polarity across the base and emitter of said first transistor to bottom said first transistor for the durations of the applied pulses; and means, including said second transistor, for deriving across said fourth winding pulse output signals whose amplitude is a function of the source voltage connected to the collector of the second transistor and whose width is a function of the duration of the pulses applied to said first transistor and of the source voltage connected to the collector of said first transistor.

7. In a pulse-width modulator; a magnetic core exhibiting high flux retentivity and having a residual flux level of selected polarity, said residual flux level being but slightly lower than the saturation flux level of same polarity; a plurality of windings on said core; a first transistor having emitter, base and collector; a source of unidirectional voltage subject to variation connected to the collector of said first transistor by way of a first winding on said core; pulse means for driving said first transistor into saturation for a fixed period of time to develop a magnetizing force of a polarity to drive the flux of said core from said residual level toward flux saturation of opposite polarity, the extent to which the flux is changed being depedent upon the magnitude of the unidirectional voltage connected to said first-transistor collector; a second transistor having emitter, base and collector; means, including a second winding on said core, connecting the emitter and base of said second transistor; a source of fixed voltage connected to the collector of said second transistor by way of a third winding on said core, said third winding being regeneratively poled relative to said second winding; means, including said first, second and third windings, responsive to cut-off of said first transistor for driving said second transistor into saturation for a period of time which is dependent upon the flux level of said core at the time said second transistor is driven into saturation; and means, including a fourth winding on said core for developing output pulses of fixed amplitude whose width is dependent upon the magntude of the unidirectional voltage connected to the collector of said first transistor.

8. In a pulse-width modulator; a magnetic core exhibiting high flux retentivity and having a residual flux level of selected polarity, said residual flux level being but slightly lower than the saturation flux level of same polarity; a plurality of windings on said core; a first transistor having emitter, base and collector; a source of voltage subject to variation connected to the collector of said first transistor by way of a first winding on said core; driver means for bottoming said first transistor for a period of time to develop a magnetizing force of a polarity to drive the flux of said core from said residual level toward flux saturation of opposite polarity, the extent to which the flux is changed being a function of the duration of the period of time during which said first transistor is bottomed and the magnitude of the voltage connected to said first-transistor collector; a second transistor having emitter, base and collector; means, including a second winding on said core, connecting the emitter and base of said second transistor; a source of fixed voltage connected to the collector of said second transistor by way of a third winding on said core, said third winding being regeneratively poled relative to said second winding; means, including said first, second and third windings, responsive to cut-off of said first transistor for bottoming said second transistor for a period of time which is a function of the flux level of said core at the time said second transistor bottoms; and means, including a fourth winding on said core, for developing output pulses of fixed amplitude whose width is a function of the said flux level of said core at the time said second transistor first bottoms.

9. In combination; a magnetic core having a state of flux remanence of one polarity; a first transistor having emitter, base and collector; a source of voltage subject to variation connected to the collector of said first transistor; pulse driver means for bottoming said first transistor for a period of time to develop a first magnetizing force to drive the flux level of said core from said flux remanence of one polarity toward flux saturation of opposite polarity; a second transistor having emitter, base and collector; a source of voltage connected to the collector of said second transistor; regenerative means responsive to the cut-off of said first transistor for bottoming said second transistor for a period of time which is a function of the flux level to which said core was driven by said first magnetizing force; and means responsive to the bottomed condition of said second transistor for developing an output pulse whose width is a function of the period of time for which said second transistor is bottomed.

10. In a pulse-width modulator; first and second transistors each having input and output electrodes; a magnetic core exhibiting high flux retentivity and having first, second, third and fourth windings; means, including said first winding, for connecting a source of first voltage across the output electrodes of said first transistor, said first voltage being subject to amplitude variation; means, including said third winding, for connecting a source of second voltage across the output electrodes of said second transistor, said second voltage being of substantially fixed amplitude; means, including said second winding, interconnecting the input electrodes of said second transistor; means for applying time-spaced pulse signals of one polarity and fixed duration to the input electrodes of said first transistor to cause said first transistor to conduct strongly for the duration of the applied pulse; means, including said first and second windings, responsive to the cut off of said first transistor for developing a trigger voltage and for applying said trigger voltage to the input electrodes of said second transistor; regenerative means, including said second and third windings, for causing said second transistor to conduct strongly in response to said trigger voltage; and means for deriving across said fourth winding pulse output signals of fixed amplitude whose width is a function of the amplitude of said first voltage connected across the output electrodes of said first transistor.

11. In a pulse-width modulator: a magnetic core exhibiting high flux retentivity; a plurality of windings coupled to said core; a first amplifier having input and output electrodes; means, including a first winding of said core, for connecting across the output electrodes of said first amplifier a source of unidirectional voltage which is subject to variation; means connected to the input electrodes of said first amplifier for applying thereto time-spaced pulses of fixed duration for driving said amplifier into conduction for a fixed period of time, thereby to develop and to apply to said core through said first winding a magnetizing force of a polarity to drive the flux of said core from its residual level toward flux saturation of opposite polarity, the extent to which the flux is changed being dependent upon the magnitude of the variable unidirectional voltage connected across the output electrodes of said first amplifier; a second amplifier having input and output electrodes; means, including a second winding of said core, interconnecting the input electrodes of said second amplifier; means, including a third winding of said core, for connecting a source of fixed voltage across the output electrodes of said second amplifier, said third winding being regeneratively poled relative to said second winding; means, including said first, second and third windings of said core, responsive to cutoff of said first amplifier for developing a trigger voltage for triggering said second amplifier into conduction and for causing said second amplifier to conduct strongly for a period of time which is dependent upon the flux level of said core at the time said second amplifier is triggered into conduction; and means, including a fourth winding of said core, for developing output pulses of fixed amplitude whose width varies as a function of the magnitude of the variable unidirectional voltage connected across the output electrodes of said first amplifier.

References Cited in the file of this patent

UNITED STATES PATENTS 2,780,782 Bright ---------------- Feb. 5, 1957